United States Patent
Kinkley

(10) Patent No.: US 10,047,814 B2
(45) Date of Patent: Aug. 14, 2018

(54) BRAKE ROTOR HAVING VISUAL WEAR CONTROL INDICATORS

(71) Applicant: BRAKE PARTS INC LLC, McHenry, IL (US)

(72) Inventor: Nathaniel Kinkley, McHenry, IL (US)

(73) Assignee: Brake Parts Inc LLC, McHenry, IL (US)

( * ) Notice: Subject to any disclaimer, the term of this patent is extended or adjusted under 35 U.S.C. 154(b) by 0 days.

(21) Appl. No.: 15/605,835

(22) Filed: May 25, 2017

(65) Prior Publication Data

US 2017/0356515 A1 Dec. 14, 2017

Related U.S. Application Data

(60) Provisional application No. 62/348,636, filed on Jun. 10, 2016.

(51) Int. Cl.
*F16D 66/02* (2006.01)
*F16D 65/12* (2006.01)
*F16D 69/00* (2006.01)

(52) U.S. Cl.
CPC .......... *F16D 66/02* (2013.01); *F16D 65/12* (2013.01); *F16D 2069/004* (2013.01)

(58) Field of Classification Search
CPC ..... F16D 66/02; F16D 65/12; F16D 2069/004
USPC .................................................. 188/1.11 W
See application file for complete search history.

(56) References Cited

U.S. PATENT DOCUMENTS

| 2002/0060108 A1* | 5/2002 | Moore .................... F16D 65/12 |
| | | 188/1.11 W |
| 2004/0084261 A1 | 5/2004 | Burgoon et al. |
| 2015/0267768 A1* | 9/2015 | Butz .................... F16D 65/127 |
| | | 188/1.11 W |

FOREIGN PATENT DOCUMENTS

| EP | 0670434 A1 | 6/1995 |
| EP | 0670434 * | 9/1995 |
| EP | 1416183 B1 | 6/2004 |
| EP | 2090798 B1 | 8/2009 |
| FR | 2765290 | 12/1998 |

OTHER PUBLICATIONS

International Search Report and Written Opinion, Appl. No. PCT/US20171034577, dated Sep. 26, 2017.

* cited by examiner

*Primary Examiner* — Vishal R Sahni
(74) *Attorney, Agent, or Firm* — Winston & Strawn LLP

(57) ABSTRACT

A brake rotor for a vehicle that includes an easy to view accurate visual inspection system. The brake rotor includes at least one annular disk including inboard and outboard planar brake contact surfaces and at least two visual wear indicators formed as circular depressions in at least the outboard brake contact surface within the outer brake contact region. These visual wear indicators include a first wear indicator that has a depth that corresponds to a predetermined minimum useable thickness of the outboard planar brake contact surface and a second wear indicator that has a depth that corresponds to an intermediate useable thickness of the outboard planar brake contact surface. Thus, the difference in wear from the elimination of the second wear indicator compared to the first provides an indication of the remaining acceptable service life of the rotor.

14 Claims, 3 Drawing Sheets

BRAKE ROTOR HAVING VISUAL WEAR CONTROL INDICATORS

This application claims the benefit of provisional application 62/348,636 filed Jun. 10, 2016, the entire content of which is expressly incorporated herein by reference thereto.

BACKGROUND

The invention relates to a disk brake rotor with a wear indicator that does not affect operation of the rotor yet allows easy visual inspection of brake rotor wear without having to remove the brake rotor from the vehicle. The wear indicators of the invention provide both an indication of how much wear is occurring to the rotor as well as a relative estimation of how much acceptable service life remains prior to requiring replacement.

Conventional disk brake rotors generally include a pair of mutually spaced-apart annular disks that form two opposed planar brake contact surfaces. These opposed brake contact surfaces receive braking force as applied by a brake caliper through two opposed brake pads. The rotors encounter frictional forces and heat buildup whenever the brakes are applied. While the brake pads are designed to wear and be replaced, the rotor can also wear or become damaged due to heat degradation and material fatigue caused by the cyclical application of frictional brake forces. Eventually, the brake pads can become worn to a point where replacement is necessary. The full life expectancy of brake pads and rotors cannot be precisely determined in advance as this would depend upon a number of variables such that it will be different for each vehicle and driver. For this reason, periodic inspection of brake pads and rotors is necessary.

Brake pads are designed to include visual or audible indications of brake pad life. These can include metal wear indicators located to one side of the brake pad, which generally exhibit an audible sound when the brake pads are sufficiently worn to a point where the metal indicators contact the rotor surface during braking. More complex indicators on some vehicles activate circuits that illuminate a warning indicator when brake pads are worn down too far. In contrast, the wear on brake rotors is not as readily ascertainable. Each brake rotor is designed for a particular application and has a minimum dimensional thickness after which time the brake rotor no longer operates in as safe capacity and requires replacement. Generally, vehicle manufacturers prefer smaller margin of wear on brake rotors to control vehicle weight and gas mileage. It is therefore imperative that these rotors be inspected to assure that they have sufficient thickness to facilitate an acceptable braking performance.

While a severely uneven, pitted or scored contact surface on a brake rotor may be quickly identified by a trained mechanic's eye, the remaining life of a rotor that does not contain such serious defects cannot be readily determined visually. It cannot be assumed that the wear will be uniform during further vehicle operation, and because different rotors have differing dimensions and design criteria, a visual inspection is not considered. Instead, conventional inspection techniques involve precise measurements of the rotor contact surfaces using micrometers or similar equipment. Such rotor inspections require expensive and properly calibrated equipment as well as the knowledge of the appropriate minimum thickness for the rotor. This adds cost and complexity to a proper determination of rotor condition.

One prior solution to this problem is an implementation by the original automotive manufacturer as well as by aftermarket manufacturers to engrave a logo of minimum thickness somewhere on an outward facing surface of the rotor. The disadvantage of this procedure is that the rotors are primarily made of iron which rusts thus obscuring the minimum thickness engraving so that it is very difficult or not possible to accurately gauge remaining useful life in the rotors. This is procedure is also very time consuming.

There have been other attempts in the prior art to provide visual wear indicators on brake rotors. For example, U.S. Pat. No. 6,457,566 discloses a brake rotor that includes at least one visual wear indicator formed on either the inboard or outboard break contact the surface. These indicators include a recess surface that is substantially parallel to the break contact surfaces and that has a depth corresponding to a minimum usable thickness of the rotor. This patent discloses a single wear indicator near the outer portion of the brake pad contact surface in order to indicate wear in that area. While this is useful, it only provides an indication of when the rotor may still provide acceptable performance and only when the wear indicator is no longer visible, is there an indication that the brake rotor must be replaced. As such, the patent does not disclose or suggest how much time it might take before replacement is needed.

U.S. Pat. No. 6,279,698 also discloses a brake disc that has wear visual control components in the form of radial grooves shaped as a circle and applied upon the swept braking surface of the disk. These grooves are intended to remove water from the surface of the brake disc but by controlling the depth of the grooves, they can also act as wear visual control means. Again, however, these merely indicate that when the grooves disappear or are just visible, the brake disc has reached its maximum wear limit and must be replaced. The patent does disclose that one of the radial grooves may have a depth of about 0.1 to 0.3 mm shallower than the others, so as to act as an indication of the imminent complete wear of the disc, but this only signifies that the rotor is nearing the end of its useful life without providing any indication of how much time, quantitatively or relatively, might occur before rotor replacement is needed.

Accordingly, there is a need for a brake rotor that is capable of a simple visual inspection to determine remaining useful life or wear conditions that suggest replacement, and these are now provided by the present invention.

SUMMARY OF THE INVENTION

The invention now provides a brake rotor for a vehicle brake system that includes an easy to view accurate visual inspection system in the form of carefully designed and configured wear indicators.

The brake rotor includes a central hub rotatably mountable to a vehicle for rotation about an axis; at least one radially extending annular disk extending radially from the central hub, then at least one annular disk including inboard and outboard planar brake contact surfaces in respective inner and outer brake contact regions; and at least two visual wear indicators formed as conical depressions in at least the outboard brake contact surface within the outer brake contact region, the visual wear indicators including a first wear indicator that has a depth that corresponds to a predetermined minimum useable thickness of the outboard planar brake contact surface and a second wear indicator that has a depth that corresponds to an intermediate useable thickness of the outboard planar brake contact surface. Thus, the difference in wear from the elimination of the second wear indicator compared to the first provides an indication of the remaining acceptable service life of the rotor. Advantageously, the second indicator corresponds to about one half of the useable thickness of the outboard planar brake contact surface so that a "half-life" of the brake rotor can be estimated wherein the remaining service life of the rotor is approximately the same as the service life from inception until elimination of the second wear indicator.

The brake rotor preferably comprises a third visual wear indicator on the outboard brake contact surface having a depth that corresponds to a predetermined minimum useable thickness of the outboard planar brake contact surface. Thus, the first visual wear indicator can be located in an upper portion of the outboard planar brake contact surface while the third visual wear indicator can be located in a lower portion of the outboard planar brake contact surface to provide measurements in two different locations of the brake contact region. It is beneficial to have the first, second and third wear indicators spaced apart by 120 degrees around the outboard planar brake contact surface.

In a further embodiment, the first visual wear indicator can be located in an third portion of the outboard planar brake contact surface, the second visual wear indicator is located in a middle third portion of the outboard planar brake contact surface and the third visual wear indicator is located in a lower third portion of the outboard planar brake contact surface. Also, the first, second and third visual wear indicators can be aligned on a decreasing spiral path on the outboard planar brake contact surface for optimum spacing of the indicators and optimum wear analysis of brake rotor surface wear.

The wear indicators are cylindrical conical reliefs made using a 150 degree drill. The first and third wear indicators each has a diameter of about 7 mm while the second wear indicator has a diameter of about 3.5 mm. The critical dimension is the depth from the brake surface which is dependent on the original rotor design and specification for minimum thickness.

It is also useful for the brake rotor to further include the same two or three visual wear indicators in the inboard brake contact surface within the inboard brake contact region, the visual wear indicators.

BRIEF DESCRIPTION OF THE DRAWINGS

The features and advantages of the present invention will become apparent from the following description of preferred embodiments with reference to the appended drawings, wherein.

DETAILED DESCRIPTION OF THE INVENTION

Figure 1:
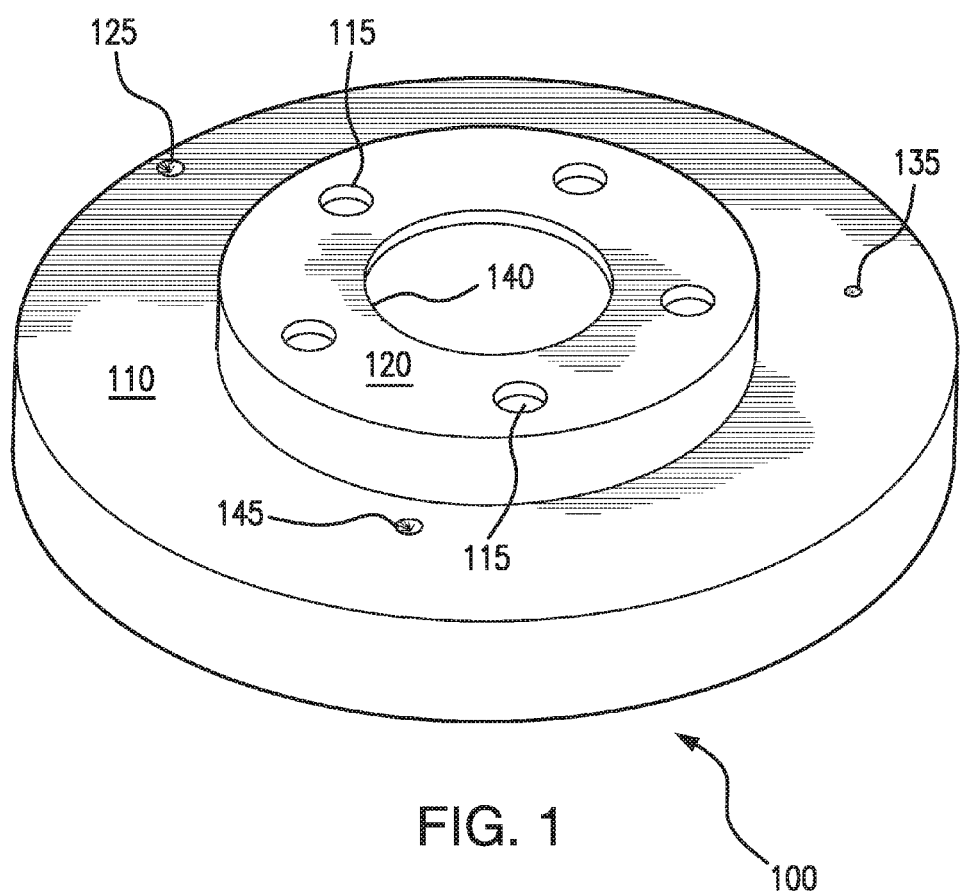
FIG. 1 is a perspective view of a brake rotor according to the present invention.

The present invention advantageously consists of three conical markers on the outboard rotor surface to indicate wear during use. As the rotor wears from normal use, these markers would shrink in size to show the progression of rotor wear and ultimately to indicate when a rotor has exceeded its intended life cycle.

The base line function of the brake rotor of the invention is unchanged from prior rotors. This allows anyone to quickly identify where the rotor is at in its useful lifecycle as determined by gradual material removal. "Useful lifecycle" is defined as the period of time or miles to wear from the original brake thickness to a minimum thickness as specified by the rotor manufacturer. The present rotor can be applied to new vehicles to monitor rotor life or can be available as an aftermarket replacement brake rotor with the added benefit of lifecycle indication.

The wear indicator markers are drilled on the outboard rotor surface in order to facilitate a "through the wheel" visual inspection as oppose to removing the wheel for a micrometer inspection. Equally distributed markers provide a report from each wear area (i.e., the outer brake swept wear area, the inner brake swept wear area, and the mid-brake swept wear area. The outer and inner markers are drilled to the minimum thickness of the rotor, and as long as these are visible it indicates that the rotor has remaining wear life. After these are no longer visible, the rotor must be discarded and replaced. The mid-marker is preferably drilled to half the depth of the minimum usable thickness: this will be completely worn away when the part is at half-life cycle and will provide some indication of how much longer the rotor can be functionally appropriate.

The surface diameter of the marker cone will decrease in size as the rotor wears. This can also be used to indicate how long until the rotor could be used before it will need to be replaced. Additionally, the spacing and orientations of the markers will show if there is any uneven wear of the rotor.

The invention provides a significant advantage over the prior art by allowing the useful lifecycle of the rotor to be quickly assessed through the wheel visually and without the use of tools. When the smaller or secondary depression or dimple is no longer visible as a result of material removal, this indicates that the rotor is halfway through its useful lifecycle. When both of the two larger dimples are no longer visible this indicates the rotor has reached the end of its useful lifecycle and should be replaced with a new part. And if only one of the larger dimples has been worn away, this indicates uneven rotor wear which is likely be a symptom of additional parts that require servicing.

During the development of this invention, various standard drill profiles were tested to determine which could be useful in the present invention. A number of readily available profiles were evaluated in side by side comparisons for the same depth of drilling. It was found that the angle of the bit greatly affects the surface diameter of the markers, with 150° found to provide the best results because the low entry-exit angle would have the least interference with braking and the greatest visual presence.

The visual wear indicators of the present invention provide a relative indication of the amount of wear of the rotor, so that the user can estimate when the service life of the rotor is complete and the rotor requires replacement. The inclusion of a secondary indicator that is preferably approximately half the size in both diameter and depth of the primary wear indicator allows the user to drive the car for as long as possible until the secondary wear indicator has been worn away. When this is observed by visual inspection of the rotor, the user then would understand that he or she has approximately the same amount of time or miles left since first using the car before the rotor requires replacement. Thus, and hypothetically, if the rotor appears to have been worn to half its service life by removal of the secondary wear indicator after a period of 10,000 miles of driving, this would indicate that the complete service life would be exhausted in another 10,000 miles or 20,000 miles in total from the initial driving of the vehicle after installation. Of course this assumes that the vehicle will continue to be driven in approximately the same manner as it was for the first 10,000 miles that resulted in the removal of the secondary wear indicator, but it is somewhat more accurate than just having the primary indicator worn away which then tells the driver that the rotor must be immediately replaced.

Another way to look at this is by comparing the time driven that accounted for the one half service life and anticipating a similar additional amount of time before replacement of the rotor is needed. While these are not completely precise estimates because the driving conditions can be changed, they at least provide some indication and guidance to the vehicle owner as to when rotor replacement would need to be considered. None of the prior art known to the inventor discloses a relationship of this type to provide such valuable information.

And even if the estimates are not accurate, whenever tires are rotated or other service is performed on the vehicle, a quick inspection can confirm that at least the primary indicators are still present and that the rotor can still provide acceptable performance and a continued service life without imminent concern to the vehicle owner.

It is also possible to have additional wear indicators of different sizes if one desired to fine-tune the monitoring of brake rotor wear. For example, it is not necessary to be concerned with initial wear that affects less than half of the service life of the rotor, but further wear indicators that are when a lesser amount of the rotor is worn can be provided if desired. For example, an additional indicator that shows when one quarter of the acceptable thickness of the rotor is removed can be provided as a further indicator of rotor service life. This can be compared to other indicators to more accurately determine how fast or slow the rotor ear rate is. What is more important, however it would be to provide a further wear indicator that would show when, e.g., 75% of the thickness of the rotor braking surface is removed as a further check between the halfway point and the full depletion of the wear surface. Accordingly, the invention is operable with different sized wear indicators ranging from various proportions of the wear surface, including quarters, thirds, or even 10% increments of the thickness of the braking surface of the rotor. Thus, skilled artisans can select whichever number and sizes of wear indicators that are desired for any particular rotor based on the anticipated performance of the vehicle.

Turning now to the drawing figures, a brake rotor in accordance with the present invention is illustrated. The brake rotor 100 has a break contact surface one 110 and a hub 120 that mounts on the wheel of an automobile. The break contact surface 110 includes three visual markers a primary visual marker 125 a secondary visual marker 135 and tertiary visual marker 145.

The brake rotor 100 typically has having two opposed brake contact surfaces (from surface 110 being shown and the opposing parallel surface not shown) formed on an annular disk that includes the center hub 120 for mounting on a vehicle wheel of a diameter B having mounting features 115 circumferentially spaced about a central axis, a central aperture 140 of a diameter D, and one or more visual wear indicator bore(s) 150 located within a brake region 160 at radius C/2 from the central axis.

Aperture 140 of rotor 100 accommodates mounting on an extending shaft of a wheel axle or steering hub of a vehicle, such as an automobile, truck, motorcycle or other land vehicle, i.e., the shaft or hub pilot nose is received within aperture 140. Mounting features 115 on mounting hub 120 are typically a through bore sized to receive an appropriate wheel stud. Such bores usually have a conventional configuration, such as 4, 5, 6, 8 or more through bores equally spaced about the center axis at a predefined bolt circle diameter. For example, an exemplary embodiment is shown with a 5 bolt pattern spaced on a 4.250" bolt circle, which is a conventional configuration for many U.S. vehicles. Other conventional mounting features can be readily substituted as these features do not form an essential part of the invention.

Brake rotors 100 are usually formed or molded from cast iron, but may also be formed of other metals and composite materials, such as aluminum, titanium, carbon fiber, and impregnated polymer composites. The exact material is not critical to the invention and may be any conventional or subsequently developed composition found suitable as a brake rotor surface. Preferably, but not necessarily, the rotor is of a unitary construction formed of a single material, which may be a composite of cast iron or other suitable material.

At least one and typically two radially extending axial disks extend from hub 120 to form brake contact surfaces, the outboard surface of which is shown as 110. The back side of the rotor would have a similarly configured inboard surface. The inventive brake rotors 100 are further formed with at least two and preferably three or more visual wear indicators 125, 135 and 145 on at least the outboard contact surface 110. If desired, the same type indicators can be provided on the inboard surface to monitor rotor wear on that surface.

The ability of the brake rotor 100 to dissipate heat generated by the braking forces is critical to proper operation of the braking system. Thus, brake rotors are typically provided with an internal vane structure of thin, spaced radially extending vanes between two annular disks that include the outboard and inboard surfaces. Air flow paths are defined between adjacent vanes to assist in air cooling of the rotors. Details of such vanes structures are well known and do not form an essential part of the invention. Accordingly, further description is omitted.

The need for a visual wear indicator for brake rotors is discussed herein, but in the present invention these are designed to not affect the braking efficiency nor to be obtrusive to maximize the efficiency of the rotor. That is, the indicators are made of a relatively small size that does not require removal of a large amount of rotor material, to thus maximize rotor mass and surface area. Moreover, the visual wear indicators are carefully located on the contact surface 110 in a braking region that is contacted by a brake pad during use, as it is only this area that is subject to wear.

There are several possible configurations for the inventive visual wear indicators. The size and shape of the depression is selected so as to remove only a small amount of rotor material. This reduces the possible detrimental effect of the depression on the brake system, e.g., drag, noise, rotor balance and the like. And by making the depression as a conical hole with sloped sidewalk as shown, a very economical manufacturing process can be used to form it. For example, the formed rotor may be fixedly mounted and a simple machine tool such as a drill press with a rotating bit moveable in a single degree of freedom (translatable in one plane) can be used to form the hole. As noted, a 150 degree drill is used to provide depression sidewalls at an angel of 150 degrees which provides the least effect on removal of rotor material during braking. The primary wear indicator 125 will have a diameter of about 7 mm and a depth of about 1.0 mm. The secondary wear indicator 135 will have a diameter of about 3.5 mm and a depth of about 0.5 mm. For different embodiments, the depth of the primary visual wear indicator corresponds to a desired minimum useable rotor thickness contemplated by the manufacturer.

The angle of the drilled holes is 150° based on the type of drill bit that is used. The specific preferred depths that can be provided are determined as follows:

D1=((Rotor Thickness)−(Minimum Thickness))/2 (taking into account that the wear is on both sides of the rotor). This is used to determine the primary wear indicator 125.

D2=((Rotor Thickness)−(Minimum Thickness))/4 (i.e., one half of the total acceptable wear of the rotor.) This is used to determine the secondary wear indicator 135.

The spacing of the markers is preferably 120° from each other about the center of the rotor.

Figures 3, 4:
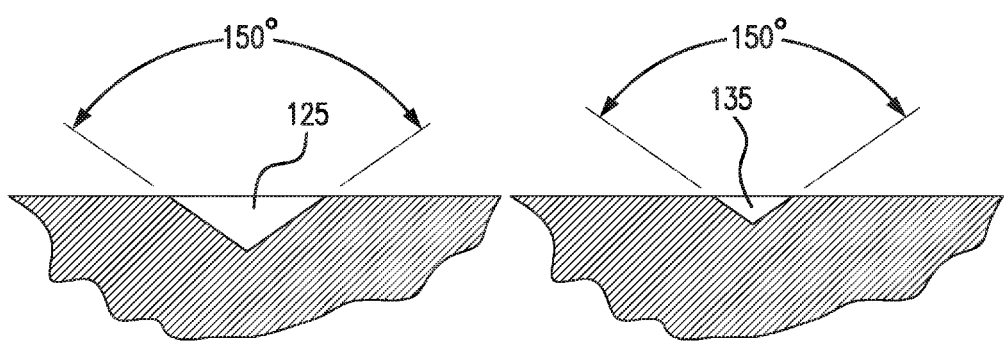
FIG. 3 is a cross-sectional view of the brake rotor of FIG. 5 taken along lines 3-3 thereof.
FIG. 4 is a cross-sectional view of the brake rotor of FIG. 5 taken along lines 4-4 thereof.

FIGS. 3 and 4 illustrate more clearly the difference in size between the secondary visual indicator 135 as shown in FIG. 4 with the primary visual indicator 125 as shown in FIG. 3. The primary visual indicator has a diameter that is approximately double that of the secondary visual indicator. Both indicators are made using the drill bit that creates a relief that has sidewalls forming an angle of approximately 150° from one side of the other. The depth of the secondary visual indicator is approximately one half that of the first primary visual indicator as shown in the comparison between FIGS. 3 and 4.

As noted, at least two wear indicators are necessary for proper operation of the invention. This would include the primary wear indicator 125 which as shown can be provided in an outer area of the contact surface 110 as shown in the drawings. In addition, the secondary wear indicator 135 is provided in a different radial location on the contact surface 110 but again in a region that is contacted by the brake pad during use. As brakes are applied during driving of the vehicle, the contact surface 110 begins to wear. At some point, the surface is worn away sufficiently so that secondary wear indicator 135 is no longer visible. As that indicator is configured to be one half the thickness of the acceptable rotor contact surface 110, when this indicator is no longer visible, about one half of the rotor life is completed.

Figure 2:
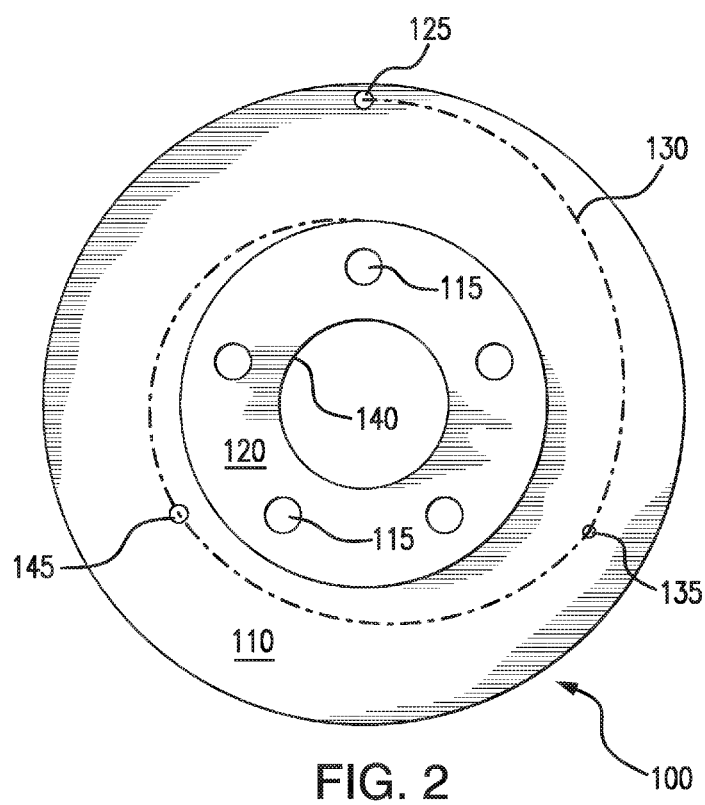
FIG. 2 is a front view of the brake rotor of FIG. 1.
Figure 5:
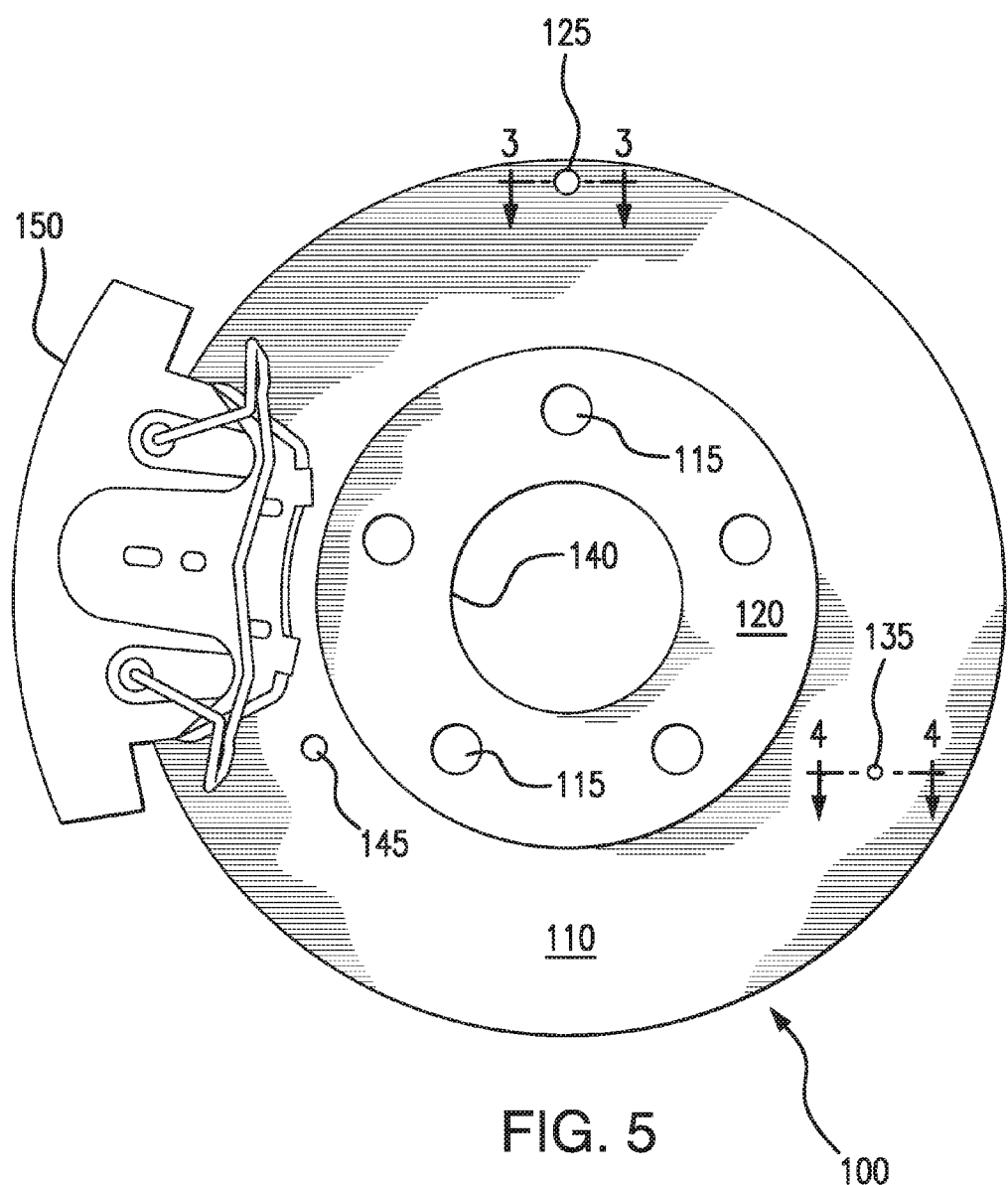
FIG. 5 is a front view of a brake rotor to illustrate the brake pad associated therewith.

A preferred arrangement is shown in FIGS. 1, 2 and 5 wherein three wear indicators 125, 135 and 145 are shown being present in the spacing across the pad-swept area, as follows:

primary indicator (outer marker) 125—the surface diameter is 5 mm from the rotor edge;

secondary indicator (mid marker 135)—the center of the cone of this half size marker is located on the midpoint between the 5 and 10.1 mm margins; and tertiary indicator (inner marker 145)—the surface diameter is 10.1 mm from the inner diameter of the outboard brake swept area.

The outer and inner markers are generally configured with the same shape and size, typically as a cone as shown, so that uneven wear on the rotor can be identified when these two indicators are found to not wear at the same rate. Alternatively, these two visual markers can be configured with different shapes or depths to provide further information as to the wearing of the rotor as described herein. The obtuse conical shape is preferred as the brake pads are less affected by the surface variation by way of those markers. FIG. 5 illustrates the location of the brake pad and the mechanical assembly 150 that holds them and applies them to the rotor for braking operations.

Typically, each marker is centered in a radial distance that is approximately in the middle of each ⅓ of the swept area of the braking surface of the rotor, with the outer one in the outer third, the mid marker in the center third and the inner marker in the lower third of that surface. Of course, the spacing will be dependent the outer and inner diameters of the brake surface. And as shown in FIG. 2, the three visual markers are arranged about the surface 110 at a spacing of 120 degrees. Furthermore, these markers are arranged along a decreasing spiral path for optimum arrangement on the contact surface 110. The particular dimensions of these locations is given previously. Of course, a skilled artisan can vary these positions if desired and further can provide additional indicators to balance the rotor to provide further benefits in the smoothness of the ride of the vehicle. For example, if two markers are used, they would be spaced by 180 degrees, four markers would have a spacing of 90 degrees, six would be 60 degrees, etc.

And as noted, it is possible to include the same type of wear indicators and locations on the inboard side of the rotor to monitor the wearing of that surface of the rotor.

EXAMPLE

An on-road test was conducted to determine whether the markers would interfere with vehicle braking performance. The vehicle that was used for the testing is a 2003 Volkswagen Passat GLS 1.8T 4 cyl. This vehicle has average annual mileage and is in the typical maintenance window for replacement rotor sales. The mileage when the new rotor was installed was 115,625 miles. The feedback during operation of the vehicle was positive, as no noise or vibration was caused by the visual markers with braking found to be as smooth and responsive as expected for a rotor that did not contain such visual markers. This indicates that the wear indicators did not affect the braking performance of the vehicle while also providing visible indicators of wear on the rotor.

The invention as described is not limited to the specific embodiments described. Instead, the inventive visual wear indicator and rotor can have various other configurations. For example, instead of a simple cylindrical counterbore, the counterbore may be square or take the form of a more complex shape or shapes, such as a triangle or star form or even a custom insignia or logo. The shape of the indicator is not overly important, rather, the location and depth of the visual wear indicator are the critical parameters. That is, the wear indicator should only be provided in a location that is fully contacted by a brake pad during use so that the indicator is a proper indicator of rotor wear in the region that forms a braking surface. Additionally, the wear indicator should have a recessed surface that is substantially parallel to the brake contact surface and the depth of the rotor material at the bottom of the indicator should be equal to or greater than the predetermined minimum useable thickness of the rotor, so as to indicate when the rotor has worn to a point where it is no longer serviceable. And as long as there is a secondary indicator which is roughly half the size and depth of the other indicator(s), the partial wear life can be estimated.

While not necessary, it is also contemplated that such visual wear indicators may be painted, coated, anodized or the like so as to visually contrast from the remainder of the rotor surface, which in most cases is a dull, polished metallic finish. For example, the wear indicator surface can be applied with a coat of a highly visible or contrasting color, such as red. Obviously, when such coating is to be used, the counterbore depth may measure shallower as a result of the thickness of the paint or other coatings. The true depth within the main rotor body is not affected as coatings will wear away insignificantly during normal use on the vehicle. Such a colored coating can have multiple purposes. When the rotor is new, it provides a distinct visual cue that this rotor is different from normal rotors and has the inventive visual wear indicators. Second, as is known, metallic rotors rust during use and exposure to elements. Thus, only those surfaces that are worn down by contact with the brake pads are free of such rust. By coating the wear indicator surface, this surface can be protected from rust build up, which could affect the proper visual indicator function. Further, even to the extent that rust may accumulate on top of the coated visual wear indicator, when the rotor is worn to the true limit of the wear indicator, any such rust or accumulation will be scraped off by the contact with the brake pads until the coating shows through to give a contrasting visual indication that the rotors are worn, which indication may otherwise be obscured if the coating is not provided.

While the systems of the invention have been described in conjunction with the specific embodiments outlined above, it is evident that many alternatives, modifications and variations will be apparent to those skilled in the art. Accordingly, the exemplary embodiments are intended to be illustrative, not limiting. Various changes may be made without departing from the spirit and scope of the invention

What is claimed is:

1. A brake rotor for a vehicle brake system, comprising:
   a central hub rotatably mountable to a vehicle for rotation about an axis;
   at least one annular disk extending radially from the central hub, then at least one annular disk including inboard and outboard planar brake contact surfaces in respective inner and outer brake contact regions; and three visual wear indicators formed as conical depressions in at least the outboard brake contact surface within the outer brake contact region, the visual wear indicators including a first wear indicator that has a depth that corresponds to a predetermined minimum useable thickness of the outboard planar brake contact surface, a second wear indicator that has a depth that corresponds to an intermediate useable thickness of the outboard planar brake contact surface, and a third visual wear indicator on the outboard brake contact surface having a depth that also corresponds to a predetermined minimum useable thickness of the outboard planar brake contact surface;
   wherein the difference in wear from the elimination of the second wear indicator compared to the first provides an indication of the remaining acceptable service life of the rotor,
   wherein the first, second and third wear indicators are spaced apart by 120 degrees on plane of the outboard planar brake contact surface with the first visual wear indicator located in an upper portion of the outboard planar brake contact surface, the second wear indicator located in a central portion of the outboard planar brake contact surface, and the third visual wear indicator located in a lower portion of the outboard planar brake contact surface, and
   wherein the primary and third visual wear indicators indicate a minimum useable thickness beyond which replacement of the rotor is mandated.

2. The brake rotor of claim 1, wherein the second indicator corresponds to about one half of the useable thickness of the outboard planar brake contact surface so that the remaining service life of the rotor is approximately the same as the service life from inception until elimination of the second wear indicator.

3. The brake rotor of claim 1, wherein the first visual wear indicator is located in a third portion of the outboard planar brake contact surface, the second visual wear indicator is located in a middle third portion of the outboard planar brake contact surface and the third visual wear indicator is located in a lower third portion of the outboard planar brake contact surface.

4. The brake rotor of claim 3, wherein the first, second and third visual wear indicators are aligned on a decreasing spiral path on the outboard planar brake contact surface.

5. The brake rotor of claim 1, wherein the first and second wear indicators are cylindrical conical counterbores made using a 150 degree drill.

6. The brake rotor of claim 5, wherein the first wear indicator has a diameter of about 7 mm, and the second wear indicator has a diameter of about 3.5 mm.

7. The brake rotor of claim 5, wherein the first wear indicator has a maximum depth of about 1.0 mm, and the second wear indicator has a maximum depth of about 0.5 mm.

8. The brake rotor of claim 1, wherein further comprising at least two visual wear indicators formed as conical reliefs in the inboard brake contact surface within the inboard brake contact region, the visual wear indicators including a first wear indicator that has a depth that corresponds to an intermediate useable thickness of the inboard planar brake contact surface and a second wear indicator that has a depth that corresponds to a predetermined minimum useable thickness of the inboard planar brake contact surface.

9. The brake rotor of claim 8, further comprising a third visual wear indicator on the inboard brake contact surface having a depth that corresponds to a predetermined minimum useable thickness of the inboard planar brake contact surface.

10. The brake rotor of claim 1 wherein the first, second and third wear indicators on the inboard brake contact surface are spaced apart by 120 degrees on plane of the inboard planar brake contact surface with the first visual wear indicator located in an upper portion of the inboard planar brake contact surface and the third visual wear indicator located in a lower portion of the inboard planar brake contact surface, and wherein the primary and third visual wear indicators indicate a minimum useable thickness beyond which replacement of the rotor is mandated.

11. The brake rotor of claim 1 wherein the primary and third visual indicators each have a diameter that is approximately double that of the secondary visual indicator.

12. The brake rotor of claim 1 wherein the primary and secondary visual indicators are configured with different shapes to provide further information as to the wearing of the rotor.

13. The brake rotor of claim 1 wherein the visual wear indicators are painted, coated, or anodized so as to visually contrast from the remainder of the rotor.

14. The brake rotor of claim 1 wherein the primary and third visual wear indicators are configured with the same shape and depth in order to determine if uneven wear is occurring on the rotor.

* * * * *